Jan. 5, 1932.  N. C. BARNES  1,839,943
SPRING SHACKLE
Filed May 21, 1928
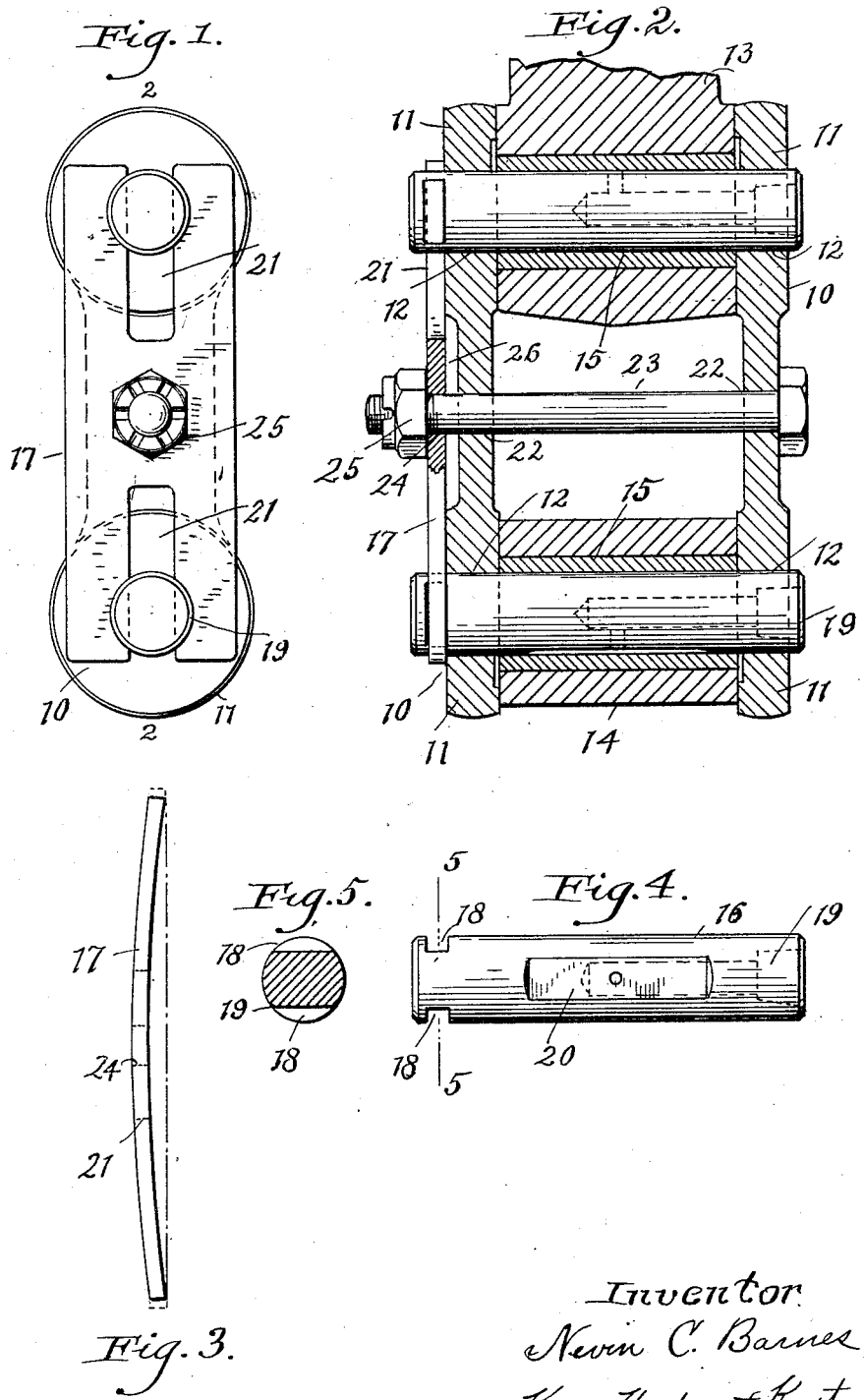
Inventor
Nevin C. Barnes
Kwis Hudson & Kent
attys.

Patented Jan. 5, 1932

1,839,943

UNITED STATES PATENT OFFICE

NEVIN C. BARNES, OF CLEVELAND, OHIO

SPRING SHACKLE

Application filed May 21, 1928. Serial No. 279,306.

This invention relates to a spring shackle and more particularly to a shackle used in connection with the leaf springs on various vehicles.

Shackles of this general type are provided with two weight carrying members usually in the form of bolts or pins, one of which acts as a pivotal connection between the shackle and a bracket secured to the frame of the vehicle, and the other of which has a pivotal connection between the shackle and the spring. Of course, where full elliptical springs are used both of the weight carrying members act as a pivotal connection between the shackle and the two branches of the spring.

An object of the invention is to provide in a spring shackle means for maintaining the links thereof in assembled engagement under tension with the spring members and for holding the weight supporting members in position and against relative movements.

Another object is to provide a spring shackle wherein the parts thereof are of simple design, capable of economic manufacture and readily assembled.

Other objects and advantages will become apparent as the description proceeds.

An embodiment of the invention is illustrated in the accompanying drawings, wherein—

Fig. 1 is a side elevation of the shackle;

Fig. 2 is a transverse vertical sectional view thereof taken approximately on line 2—2 of Fig. 1, portions of the spring retaining strip being shown in elevation;

Fig. 3 is a detail view of the spring retaining strip, the full line illustration showing the strip in its inactive position and the dotted line illustration showing the form which the strip takes when assembled upon the shackle;

Fig. 4 is a detail view of a weight carrying member or pin; and

Fig. 5 is a sectional view taken approximately on line 5—5 of Fig. 4.

The shackle comprises a pair of identical links 10 adapted to be arranged in spaced parallel relationship when assembled with the spring, such links having enlarged annular portions 11 at their opposite ends provided with centrally disposed openings 12. In assembling the shackle and the spring members the links 10 are arranged so as to embrace the spring supporting bracket 13 between one of their ends and the eye 14 of the spring leaf between the other of their ends. Of course, where the shackle is used with a full elliptical spring the bracket 13 will be replaced by the eye of one of the leaf springs so that the links will be connected to portions of the spring at both ends. The links are partly maintained in the position indicated by weight carrying members passed through the openings 12 in the links and through the eyes of the bracket 13 and spring 14, thus pivotally supporting such bracket and spring upon the weight carrying members. As is ordinary in spring shackle constructions bushings 15 are arranged in the eyes of the bracket 13 and 14.

As a general rule the weight carrying members used in spring shackle constructions are headed bolts adapted to receive nuts upon the opposite threaded end, such bolts not only serving the function of weight carrying members but also acting to maintain the shackle in assembled relationship. It has been found, however, that a shackle thus constructed is unsatisfactory, since during use the weight carrying members become loosened and have relative movement with respect to the links and the spring members rather than allowing the spring members to have a purely rotative movement upon the weight carrying members. Also, when the weight carrying members are capable of this relative movement, it is quite apparent that the links and spring members are not held in closely assembled relationship and consequently produce considerable rattling during operation of the vehicle. Therefore, in order to obviate such disadvantages the spring shackle herein disclosed employes weight carrying members which are positively held against relative movement and which do not serve the dual function of holding the shackle in assembled position. Also, by the present construction, the parts of the shackle, when assembled, are maintained under constant spring tension, thus preventing any rattling thereof during use.

The weight carrying members herein used are in the form of straight pins 16 which are held in position by a spring retaining strip 17, in a manner later to be described. The pins 16 are cylindrical in shape and are provided adjacent one end with flat bottomed notches 18 and adjacent the other end with a socket 19 communicating with a lubricant passage 20, such socket being adapted to receive a lubricant cup of any suitable design. When the pins are passed through the openings in the ends of the links 10 and through the bracket 13 and spring leaf 14, the ends of the pins in which the notches 18 are located are on the same side so that the spring retaining strip 17 may engage the pins within the notches.

This spring retaining strip is normally longitudinally bowed before being applied to the shackle, as indicated in the full lines in Fig. 3, and is provided with centrally arranged longitudinally extending recesses 21 extending from the opposite ends of the spring inwardly toward the center thereof. The width of the recess 21 is such that the portion of the pin between the notches 18 will pass therein while the thickness of the retaining strip is approximately the width of the notches 18. This results in the pins being held against rotative movement and also against axial movement when the spring retaining strip has been properly assembled upon the shackle.

In order to assemble the retaining strip upon the shackle the links 10 are provided with openings 22 arranged at the middle thereof, through which a headed bolt 23 extends, this bolt also extending through an opening 24 arranged at the middle portion of the retaining strip and being adapted to have a lock nut 25 threaded upon the end which projects through such opening. Hence, it is quite apparent that when the shackle is assembled with the spring members with the weight carrying members in such position that the notches 18 are upon the proper side of the shackle, the bowed spring retaining strip 17 may be positioned with the recesses 21 embracing the pins at the notches and the bolt 23 projecting through the central opening 24. The nut 25 being then tightened upon the threaded end of the bolt compresses the bowed retaining strip until it assumes the dotted line position shown in Fig. 3. When in this position the retaining strip is substantially straight and lies against the outer side of the adjacent link 10 and when properly adjusted will maintain the parts of the shackle under spring tension and prevent rattling. When the nut 25 is threaded down upon the bolt 23 the central portion of the retaining strip will be depressed, which depression is accommodated by a cutaway portion 26 arranged intermediate the ends of the links, and the opposite ends of the strip moved slightly outwardly of the shackle to tightly hold the pins in position.

Although a preferred embodiment of the invention has been shown and described, it should be understood that the invention is not limited thereto but is susceptible of such modifications and adaptations as fall within the scope of the appended claims.

Having thus described my invention what I claim is:

1. A spring shackle comprising spaced parallel side links having aligned openings adjacent their opposite ends and another opening intermediate such openings, weight carrying pins extending through the openings adjacent to the opposite ends of the links and adapted to pass through the spring members connected by the shackle, a spring strip engaging the ends of the pins and holding them against rotation, and adjustable securing means passing through the strip and the intermediate openings in both links whereby said strip may be drawn inwardly by said means to exert spring pressure acting to force the links inwardly against the spring members.

2. A spring shackle comprising spaced parallel side links having aligned openings adjacent their opposite ends and another opening intermediate such openings, weight carrying pins extending through the openings adjacent to the opposite ends of the links and adapted to pass through the members connected by the shackle, said pins being provided with a notched portion adjacent one end thereof, a spring strip engaging the notched portions of the pins to hold them against rotation, and adjustable securing means passing through the strip and the intermediate openings in both links whereby said strip may be drawn inwardly by said means to hold the links in assembled tensioned engagement with the spring members connected thereby.

In testimony whereof, I hereunto affix my signature.

NEVIN C. BARNES.